(12) United States Patent
Hepo-Oja (10) Patent No.: US 9,234,658 B2
(45) Date of Patent: *Jan. 12, 2016

(54) ACTIVE POSITIONING SYSTEM

(71) Applicant: Sauli Hepo-Oja, Helsinki (FI)

(72) Inventor: Sauli Hepo-Oja, Helsinki (FI)

( * ) Notice: Subject to any disclaimer, the term of this patent is extended or adjusted under 35 U.S.C. 154(b) by 0 days.

This patent is subject to a terminal disclaimer.

(21) Appl. No.: 14/167,182

(22) Filed: Jan. 29, 2014

(65) Prior Publication Data

US 2014/0197989 A1 Jul. 17, 2014

Related U.S. Application Data

(63) Continuation of application No. 13/816,649, filed as application No. PCT/FI2011/050718 on Aug. 17, 2011, now Pat. No. 8,682,347.

(30) Foreign Application Priority Data

Aug. 18, 2010 (FI) ...................................... 20105860

(51) Int. Cl.
*H04W 24/00* (2009.01)
*F21V 33/00* (2006.01)
(Continued)

(52) U.S. Cl.
CPC ............... *F21V 33/0076* (2013.01); *G01S 1/14* (2013.01); *G01S 3/30* (2013.01); *H04W 4/025* (2013.01)

(58) Field of Classification Search
CPC ........... G01S 5/0252; G01S 5/14; G01S 5/06; G01S 13/04; H04W 4/028; H04W 64/00; H04W 4/023; G01C 21/206
USPC ............... 455/456.1–457; 340/539.13, 12.51, 340/13.24–13.26
See application file for complete search history.

(56) References Cited

U.S. PATENT DOCUMENTS

2006/0187051 A1  8/2006 Wu ............................. 340/572.7
2007/0273530 A1 11/2007 Koezuka .................... 340/572.7

(Continued)

FOREIGN PATENT DOCUMENTS

EP    1 967 983 A2   9/2008
FI      120989 B1    5/2010
(Continued)

OTHER PUBLICATIONS

Da Zhang et al., "Localization Technologies for Indoor Human Tracking," 5th International Conference on Future Information Technology (FutureTech), May 21-23, 2010, p. 1-6.

(Continued)

*Primary Examiner* — Allahyar Kasraian
(74) *Attorney, Agent, or Firm* — Ostrolenk Faber LLP (57) ABSTRACT

The object of the present disclosure is an active positioning system for positioning at least one mobile device (100) by utilizing radio frequency technology, the positioning system comprising at least one essentially stationary fixed base station (101) i.e. an active positioning system antenna (101), and an electronics unit (106) i.e. a transceiver of the antenna (101), which transceiver comprises at least one antenna for transmitting signals comprising at least position information to at least one mobile device (100), which position information of the signals comprises information on an effect area of the antenna (102, 104) by using certain transmit power. The active positioning system comprises as the mobile device a TAG (100), which is fixed to the user or application of the TAG directly or indirectly, an electronics unit (106) of the base station (101), at least one antenna (102, 104) directed to different sections of a controlled area. The active positioning system antenna (101) receives said transmitted at least one signal of the formed measurement signals and information signals, and the positioning system antenna (101) comprises control means to control transmit power of said at least one antenna based on at least one signal of the formed measurement signals and information signals received at least by the base station for performing information processing of the mobile device position i.e. the TAG position at least based on transmit power level.

7 Claims, 3 Drawing Sheets

Area1 (Permitted area) | Area2 (Forbidden area)

(51) Int. Cl.
*G01S 1/14* (2006.01)
*G01S 3/30* (2006.01)
*H04W 4/02* (2009.01)

(56) References Cited

U.S. PATENT DOCUMENTS

2008/0001735 A1 1/2008 Tran
2008/0318683 A1 12/2008 Rofougaran et al.
2010/0090899 A1 4/2010 Zhao et al.
2010/0151784 A1 6/2010 Grau Besoli et al.
2010/0164710 A1 7/2010 Chung
2012/0139724 A1 6/2012 Keinanen et al.

FOREIGN PATENT DOCUMENTS

WO   WO 97/00503        1/1997
WO   WO 2007/027611 A2  3/2007
WO   WO 2009/151778    12/2009

OTHER PUBLICATIONS

European Search Report, dated May 28, 2014, issued in corresponding European Patent Application No. EP11 817 819.3. Total 9 pages.

ACTIVE POSITIONING SYSTEM

CROSS REFERENCE TO RELATED APPLICATIONS

This application is a continuation of U.S. patent application Ser. No. 13/816,649, filed Feb. 12, 2013, now U.S. Pat. No. 8,682,347 B2, issued Mar. 25, 2014, which is a 35 U.S.C. §371 National Phase conversion of PCT/FI2011/050718, filed 17 Aug. 2011, which claims benefit of Finnish Application No. 20105860, filed 18 Aug. 2010, the disclosure of which is incorporated herein by reference. The PCT International Application was published in the English language.

BACKGROUND OF THE INVENTION

1. The Field of the Invention

When different kinds of area specific positioning techniques develop, more and more useful applications are found.

2. State of the Art

RFID-antennas (Radio Frequency IDentification), which limit a controlled area by RF (Radio Frequency) radiation pattern to a certain area, in which limited RF area arriving mobile devices i.e. TAGs can be identified, have been sold. The mobile device is by nature a RFID tag, which does not need a current consuming active front amplifier in a RF receiver of the TAG as it operates in RF near field based on passive signal detection not becoming active before it arrives in an area of signal of sufficient strength, where it preferably and immediately can measure directly the coming signal without a load of the front amplifier, which load could be for example about 10 mA.

In this technology, such as for access control applications, the problem has been the fact that precisely in the location of the interior roof of the controlled building where the antenna would most advantageously be placed, the lamp is very often placed. In other words, the location of the lamp is very often the best antenna location or even the only good location. In addition, the problem is that the exterior sides of lamps are often metal, and thus they can easily distort the radiation pattern of the RFID antenna installed beside them. Thus, the antenna should be able, if necessary to replace the lamp when the antenna is to be positioned in the place reserved for the lamp.

Another major problem, especially in traditional RFID positioning, has been the fact that if positioning with exact limits in a small space is required, taking into account movement direction, two antennas have to be installed, which often require their own readers, and whose radiation patterns interfere with each other without special arrangements. Especially when broadcasting at the same time, the radiation patterns suffer from bad interference. In narrow places the antennas often must be placed near metal structures, such as door constructions, or pipes, which also cause distortions to radiation patterns, and for example at about 50 cm distance, can even destroy the radiation pattern.

Even if the antennas are fitted into a small space, signals are received from both antennas of the interface. In this case, without any special arrangements, area changes all the time when new signals are received even when being in place, unless the signals are measured and a TAG position is evaluated on the basis of calculations and judgements at each time point as disclosed in the patent application publication FI20095222.

A problem in automatically sending a location-based emergency call on the basis of an abnormal health status of a person in the case of a downfall is that an accelerometer should in principle be measuring acceleration all the time including before an impact possibly indicating the downfall occurs, the downfall being indicated by the end of the acceleration when the measurement of the acceleration is already too late. On the other hand, all downfalls due to worsened health status are not sudden, but a person can also be slowly and cautiously falling to the floor, when the head begins to spin. However, only the horizontal position cannot be used as an indicator of a downfall, because the horizontal position also occurs in normal situations, at least in bed.

SUMMARY OF THE INVENTION

The object of the invention is an advanced antenna technology embodiment as one positioning cell of a positioning system, where antennas and radiators can be located in as good locations as possible and having close distances between them so that said close distance or other metal structure causes no interferences in the positioning technology nor does simultaneous operation of the antennas or radiators cause interferences in the positioning technology. This is achieved by an active positioning system for locating at least one mobile device by utilizing radio frequency technology, the positioning system comprising at least one essentially stationary fixed base station i.e. an active positioning system antenna, and an electronics unit i.e. a transceiver of the antenna, which transceiver comprises at least one antenna for transmitting signals comprising at least position information to at least one mobile device, which position information of the signals comprises information on an effective area of the antenna by using certain transmitting power, which effective area of the antenna is dividable in two or more sections based on power measurement, calculation and/or judging. The active positioning system comprises as the mobile device a TAG, which is fixed to the user or application of the TAG directly or indirectly, an electronics unit of the base station, at least one antenna directed to different sections of a controlled area, and, if necessary, at least one external antenna to divide the controlled area to sections and to transmit additional information signals comprising antenna specific limit and control values to the mobile device i.e. the TAG in addition to transmitting signals comprising position information, and said TAG comprises at least one antenna to receive said signals and additional information signals transmitted by at least one antenna, and the TAG comprises at least one electronics unit to form measurement signals and information signals based on said signals and additional information signals received by the antenna for performing information processing of TAG position, and TAG comprises said at least one antenna to transmit at least one of the formed measurement signals and information signals to the active positioning system, which comprises said base station to receive said transmitted at least one signal of the formed measurement signals and information signals, and the positioning system comprises control means to control transmit power of said at least one antenna based on at least one signal of the formed measurement signals and information signals received at least by the base station for performing information processing of the mobile device position i.e. the TAG position at least based on transmit power level.

The invention is based on time division of signals used in the positioning and on dividing the controlled area into different parts and on functional effectivity in the co-operation of positioning system technology such as antennas, radiators and the electronics units to utilize said time division and area division.

The benefit of the invention is so preferred relocation of antenna technology used for positioning is possible. According to the invention compensation for the main sources of error, which have been problems of the prior art, is also successfully made.

The active positioning system antenna according to the invention, i.e. the active antenna can also in one embodiment replace a lighting unit, which has been unfortunately located in buildings in just those places where the placement of positioning system antenna is optimal.

For example, the positioning system antenna according to the invention integrated with efficient LED technology (Light Emitting Diode) lighting is feasible with so low a current that a lamp can, in a power outage situation, act as emergency exit lighting supplied by its own battery or batteries or supplied by some external certified current source or voltage source.

The advanced antenna and tag technology according to the invention can also improve the functionality of the prior art solutions in positioning, where the mobile device TAG sends a beacon signal and the base stations measure the RSSI value of the incoming signal, and try, by calculations on the system level, to determine the location of the TAG.

The main benefit will be that the active antenna with several radiators is able to determine the direction where the signal comes from and can together with step measurement of TAG and with electronic compass-based measurements define the TAG location without a base station network, which is required in conventional triangulation-based systems without removing still the possibility to further improve the positioning accuracy by co-operation of network of several active antennas utilizing for example triangulation. The electronic compass solution of the TAG enables utilization of the TAG attached to the user's body or clothing to detect position of the user in at least three coordinates (x, y, z), which feature together with the TAG reporting the person as being in bed based on, for example, the bed weight and/or on measurement of movement in the bed, at least together with positioning information provided by the system enables automatic information transmission of an abnormal situation in which a person is in a horizontal position outside of his bed.

DESCRIPTION OF PREFERRED EMBODIMENTS

According to the implementation of the invention locating of at least one mobile unit, i.e. a TAG 100 in a positioning system area is carried out by an active positioning system antenna 101 utilizing RFID-technology (Radio Frequency IDentification) radio frequency technology in the region of the system according to the invention. Tag in this patent application does not necessarily mean any standards compliant device or device part, but a device that is attached to a monitored, at least intermittently, moving and stationary target. As an antenna, a directional antenna or a message traffic antenna for reception and/or broadcasting in RF frequencies, for example, is used. When an antenna has a radiator 102, 104, it is then emphasized that the radiator is used primarily to broadcast signals, but the radiator is, therefore, also the antenna, which can be used, when necessary, for both signal transmission and reception tasks.

A very preferred solution when aiming for a small size is to locate for example an entity of two antennas in the same casing so that two separate radiators 102, 104 performing a corresponding function are installed to the same casing. In this case, the outer dimensions of the solution are obtained to smallest possible levels, and manufacturability of the product is as simple as possible. Also the base station electronics 106 is then very preferably installed inside the same antenna casing.

The active positioning system antenna 101 comprises a lighting arrangement integrated or attached to an electronics unit 106 of the antenna 101, said lighting unit being preferably accomplished by LED technology 132, 134.

An active positioning system antenna, i.e. an active antenna 101 can replace a lamp, which is interfering with the antenna, and for example two separate antennas and the RFID-base station, enabling said RFID control package for installation in a very small space, and also situated in the most preferred location area of area limitation and operability of the passage control. The active antenna 101 can also be in a high room lowered to a suitable height with a wire of the antenna such as can be done with a normal lamp.

In demanding projects the active positioning system antenna 101 comprises one or more antenna operating in time-divided manner attached to the electronics unit 106 of the antenna 101 with an external cable to obtain essentially clear area distinction.

The active antenna 101 comprises one or more radiators 102, 104, which are connected to, or more preferably integrated into the electronics unit 106. The radiators are connected most preferably to a common end amplifier time-divisionally so that the radiator, which is not connected, represents a high impedance, at least with regard to broadcast frequencies, when said radiator is not radiating, i.e. transmitting.

The radiators are separated from the amplifiers by RF switches so that each radiator in turn is connected to its own amplifier or to a common end amplifier of the radiators. An area monitored by locating and directing one or more of the external antennas 202, 204 and/or the radiators 102, 104 is divided into one or more sub-areas, especially when it is wanted to distinguish essentially clearly these sub-areas from each other.

The mobile device, i.e. the TAG 100 knows on the basis of RF signals transmitted by one or more of the radiators, or by an external antenna, the area monitored by the radiator or the antenna, which is involved at each time point. The active antenna 101 can, through one or more external antennas 202, 204 and/or internal radiators 102, 104, send additional information to the TAG, such as antenna and radiator specific control values on the basis of which the TAG will be better able to calculate and/or judge current location. The TAG 100 comprises at least one antenna 103 to perform RF-transmission/reception tasks and an electronics unit 110 for measurement of said signals received and for processing on the basis of additional information received via the antenna and/or stored in its memory.

The positioning according to the invention is performed so that a mobile device, i.e. the TAG 100 in the interface receives via one or more of the antenna 202 and/or the radiator 102, 104 signals, the intensity of which the mobile device selfmeasures and/or counts amount of said signals per time unit, and calculates and/or concludes by using different kind of algorithms on which area expressed by positioning signal transmitting antennas or radiators the TAG 100 is at each time moment. In this a crucial benefit is that the mobile device 100 itself measures the signal strength and processes it mathematically and logically so, that it is comparable to signals received by other radiators and/or antennas. The interface is to be set and changed also programmatically. These matters enables the area interfacing to operate reliably in a very small space, since in this antenna and/or radiator signals may extend overlapping each other's areas.

The invention is based on the internal radiators 102, 104 of the active positioning system antenna, i.e. the active antenna 101, directed at different points of the monitored area and/or one or more of external antennas 202, 204 connected by a cable to the active antenna electronics unit 106 sends by using at least one radiator limit and adjusting values, which are radiator specific comprising the additional information signals time divisionally in addition to spatial information containing signals. The mobile device, i.e. the TAG 100 receives said signals sent by the external antenna and/or internal radiator to process location information of said mobile device and to form measurement signals, which measurement signals and/or the processed values of them the mobile device 100 may, when necessary, send to control means comprised by the active positioning system antenna 101, when at least in the so-called learning situation radiating efficiency of the at least one of the radiator and/or the antenna is controlled specifically on the basis of said measurement signals and/or processed values of them so that the processing of mobile device location information is specified at least based on the level of radiating efficiency. At the same time filtering can be performed and parameters can be created on the basis of the filtering to be sent to the mobile device, to avoid error values existing in some awkward positioning coordinates caused by positioning signal distortions influencing the location information processing of the mobile device.

A processing part of the active positioning system antenna or active antenna 101 memorizes at least in configuration and in learning situations the values and parameters received by the TAG 100 and possibly further processed values and parameters by the processing part as radiator 102, 104 specific values or in the case of an external antenna 202 as antenna specific values, and sends this information as additional information in addition to signals containing location information to all other mobile devices 100 of the system at least when they move into the area of said positioning cell.

In an implementation according to the invention external antennas 202, 204 and internal radiators 102, 104 are to be placed close to each other, as they are, or at least some of them, time divisionally asynchronously working, so that their fields do not interfere or even cancel each other out. This time division is performed preferably by using an RF switch arrangement, when one and the same power amplifier is preferably used in transmission operation of several radiators or antennas.

However, mere time division is not yet sufficient to allow normal structured antennas 202 and radiators 102, 104 to be placed very close to each other, because without special arrangements a very close second antenna, or radiator causes radiation loss of first antenna, at least by distorting the radiation pattern. Very close placement means in this disclosure, for example, such placement of antennas and radiators that the antennas with respect to each other or the radiators with respect to each other or both the antennas and radiators with respect to each other, each depending on the implementation, are placed 2 mm-60 cm apart from each other. It is important that the transmission times of antennas and/or radiators, which are placed very close to each other be different, and, in addition, that antennas and/or radiators which are not transmitting should very preferably be electrically disconnected from the antenna or radiator which is transmitting during the transmission time. In other words, there should be a very high impedance for the transmitting radiators 102, 104 and for the antennas 202, 204 being in close proximity, at least when aiming at small outer dimensions of the entity. In this way, the antennas and/or radiators do not interfere each other's signals.

The specially designed radiators, such as the CAN antennas (English name comes from a can-shape), is to be one application form of an active antenna, in which can be achieved radiator specific directivity without interfering with each other in certain arrangements so that other radiators need not be electrically disconnected when one radiator is transmitting. However, at least outer dimensions of the solution become large compared to the smaller radiator solutions which benefit from the disconnections performed by the RF switches.

In the embodiment according to the invention a significant advantage of a low power consumption of the TAG 100 is also achieved, due to the fact that the TAG do not need a RF pre-amplifier. Indeed, in the prior art embodiment, when using the RF pre-amplifier, the power consumption is easily up to 10 mA range. In the embodiment according to the invention, the TAG is able to passively indicate a strong time divisional signal of the active positioning system antenna 101, which is in practice an RFID base station with antennas, and the TAG is able to wake up from sleep mode, when duration of the indicated signal exceeds a preset threshold, and then TAG begins to process the indicated signal. After this, the TAG will move back to sleep mode to wait for a new signal. In one embodiment of the invention, the TAG waits for a signal to its movement indicator, after which the TAG 100 only allows awakening to the positioning signal, or to start a positioning signal processing.

In the processing according to the invention a mobile device 100 utilizes a motion sensor 153 to conserve power at least by step measurement principle by rejecting repeated similar values when being in a place, or even by refusing to measure them at all, thus sparing energy in its battery.

Figure 1:
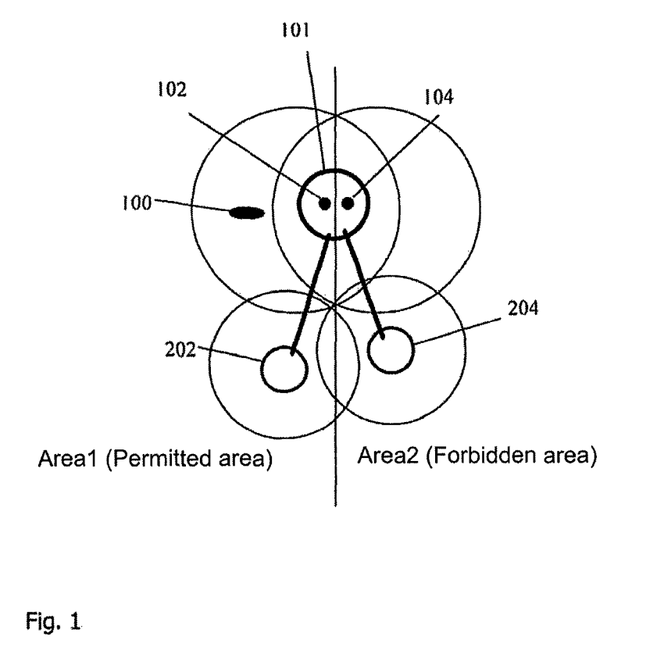
FIG. 1 presents an application example in accordance with the invention, said example having two areas to be monitored.

FIG. 1 shows the invention in accordance with the implementation of an application example, where there are two monitored areas. There is presented a doorway through which in the inner side of the "region1 (permissible range)," the TAG 100 can be moved freely, but as soon as the mobile device transitions to the other side of the interface "Area2 (prohibited area)," the TAG 100 automatically sends a notification of the border crossing.

The active antenna electronics unit 106 may further comprise at least one RFID transceiver with its processing units i.e. in practice it realizes the function of a base station comprising at least one radiator to send signals containing at least location information to at least one TAG. In this case a separate base station is not required, but all base station operations are located in the same casing, i.e. in a package. In this case, one active antenna 101, which may comprise one or more radiators 102, 104 operating time divisionally at different times, is able by itself, or at least with more of the radiators, to perform an effective area limitation in a very small area the same way as if it were two separate antennas in different locations. This embodiment enables in addition one or more external antennas 202, 204 to be connected to the active antenna, which allows the positioning area for example to be widened to cover an effectively bigger passageway.

In RFID passage control it is also beneficial for the active antenna electronics unit to perform other functions according to the invention, such as performing on the monitored area measurements by an infrared (PIR, Passive InfraRed), 133, 135 and/or ultrasound (US) motion detector, and also/alternatively, if necessary, to use IR (InfraRed) and/or ultrasound to communicate with the TAG.

In this case, the active positioning system the antenna comprises of a motion detector combined with its electronics unit 106 externally of the casing or internally of the casing, most preferably a motion detection component integrated to the same printed circuit board with the electronics unit 106, the operation of which component is based on utilization of at least one of the following technologies: infrared technology PIR 133, 135 and ultrasound technology and microwave technology, and the detection area of said component is most preferably overlapping with the area limitation performed by the radiators 102, 104. The solution then insures detection of a non-authorized person in the detection area on the basis that the person does not have a TAG 100, which would transmit to the system an authorized access code and/or identification information when entering the positioning area of the cell.

The active positioning system antenna 101 comprises at least data communication connection arrangement 121, 125 connected to its electronics unit 106 and most preferably integrated to the circuit board to deliver data between the active positioning system antenna 101 and the outside world.

Thus, when necessary, voice and/or an IP connection to the outside world, for example, by using at least one GSM/GPRS/3G/CDMA, WLAN/WiFi/WiMAX/Flash-OFDM/W-CDMA- to implement a module 125 and/or wired by using at least one of techniques phone/modem/ISDN/ADSL/VOIP/USB/Ethernet to implement a module 121 is preferably integrated into the same active antenna according to the invention.

In this case, high volume levels can, if necessary, be used in the loudspeaker 111 when the microphone 138 and the loudspeaker 111 are far apart from each other, while preferably avoiding problems caused by acoustic feedback.

In some applications, the active antenna 101 is able to communicate by wired means with the outside world, by using one or more of common Ethernet, RS-232, and for example, units and communication protocols in accordance with USB and RS485/422-x.0 standards for example when joining a passage control system of a building. For this purpose the device comprises one or more wired telecommunication modules 121 as separate modules and/or the equivalent electronics integrated directly into the circuit board 127.

Both control means of the TAG 100 and the active antenna comprise preferably programmable processor technology, such as PLC (Programmable Logic Controller), to carry out their functions, such as, for example, to form measurement signals in the TAG and to perform control of radiating efficiency by the control means.

In the preferred embodiment of the invention the active antenna may comprise at least one antenna, which is a separated antenna from the actual positioning system antennas, by which is carried out an RF signal transmission and reception to other purpose of use than the positioning. This is carried out preferably in such a way that the transmission and reception can be mutually independent on their own frequency range.

The antenna is required in some applications only to other radio frequency communication, because the RFID radiators can not receive well outside of their radiation patterns because of their directivity. In one preferred embodiment the antenna is connected or integrated with the connection cable 109 of the active antenna.

The active positioning system antenna can be placed in its most preferred location for example, so that it is accompanied by an integrated lighting arrangement, in which case both the lighting unit and the active positioning system antenna, may realize their function in a preferred location, such as for example in a lobby room of the building.

The active antenna comprises at least one RF switch available to each of the radiator, or an external antenna in turn and/or selectively at the same time being connected to one or more power amplifier, and a removable radiator 102, 104 of the isolated embodiment and/or an external antenna 202 to be galvanically so isolated that said radiator 102 or external antenna 202 becomes a high impedance object in respect to one or more other radiator 104 and/or external antenna.

The RF switch electronics can be preferably implemented in one or more integrated circuit, each of which comprises one or more of the RF switches.

The RF switch solution in the active antenna electronics unit 106, which is used for connecting the radiators, can also be used for adjusting electrical length of them and other parameters such as a reflectivity, and at least the ground level size and/or shape in order to change active antenna characteristics depending on the situation and momentary needs so that transmission frequency and radiation pattern of the radiators can be altered to prevent operation of the solution from suffering significantly. For example, transmission frequency and directivity can differ greatly from reception frequency and directivity.

The active positioning system antenna may be developed in the preferred embodiment also in such a way that to the active antenna is connected or integrated a motion detection component, which is preferably based on simultaneous utilization of infrared technology PIR 133, 135 and ultra-sound, or on utilization of at least one of them. Active antenna 101 can also be connected to data communication connection arrangement 121, 125 to deliver data between the active antenna and the outside world, i.e. other devices and/or data communication networks. Data communication connection arrangement to outside world can also be connected to or integrated with other parts of the active antenna such as for example the control means. The active antenna may also comprise means for sound reproduction and for at least two-way voice connection. Means for sound reproduction can be at least one of a speaker 111 and a microphone MIC 138, and at least one of said means can be located to the mobile device, i.e. to the TAG 100, which has a telecommunications link to at least one antenna of the positioning system antenna 101, and thus possibly also to the outside world. For example, at least one microphone 139 may be located in a TAG locating in the telecommunications link area, and be connected to at least one antenna of the positioning system antenna.

In the preferred embodiment of the invention a connection realized by articulated joints can be utilized, by which connection the directional radiator 102, 104 is connected to its electronics unit 106 to utilize said articulated joints in directing of the directional radiator 102, 104. The articulated joints can be simply made by freely bending strip made from metal or from another suitable material to connect the directional radiator 102, 104 to the body structure of the casing formed by the electronics unit 106, ground level or to the circuit board 127.

In addition to the fact that the multi-radiator solution achieves in the RF near field a good area selectivity, the solution can be used effectively in improving the long-distance field positioning, so that the TAG 100 itself sends a beacon signal after leaving the local field and the active antenna measures from a signal it receives a RSSI (Received Signal Strength Information) value by each of its radiators and/or antennas.

The active antenna is able to measure from the TAG 100 signal RSSI (Received Signal Strength Information) value for each of its radiators 102, 104, and/or antennas 202, 204, and it gets the biggest measure from the radiator 102, 104 and/or the external antenna 202, 204 located in the best direction as seen from the TAG 100 and from the others correspondingly smaller measurement values in relation to the value of angular deviation of their direction from the best direction.

For example, a solution of four radiators achieves a very high selectivity for the direction compared to normal solutions, where a single antenna cannot provide any information about the beacon (TAG 100) direction. In a preferred embodiment of the invention according to direction selectivity a single radiator is a structurally independent radiator module with directional antenna 102, 104 capabilities, in which case its radiation pattern has a good front/rear ratio (eg 10 dB) when it receives the signal coming from behind at a 10 dB lower level than the signal coming directly from front.

TAG sends step detection as seldom as possible to minimize power consumption and most preferably also step measurement by utilizing for example piezo motion detector 153. Most preferably the motion sensor is included with a shock or impact sensor 151, in which case the combination of the sensors is adjustable for different sensitivity settings.

Step length of the distance travelled can be re-calibrated each time when a person passes through a near field comprising known dimensions, which are already being formed by an active cell of the active antenna. In this role, the active positioning system antenna notifies the tag of the boundaries and/or the dimensions formed by the radiation field at least based on radiation intensities of its radiators 102, 104, and of any of its external antennas 202, 204, and if necessary, for example, utilizing data given by an IR or ultrasound radar. The method increases, after the calibration, measurement accuracy in assessment of distance travelled by the TAG.

In addition, by this advanced step measurement method, a person's energy consumption can be better assessed, especially when the person's body weight is also known.

In one application of the system, an electronic compass solution 152 is preferably included in an electronics unit 110 of the TAG 100, which sends a beacon signal and performs a step measurement. The electronic compass solution 152 measures the direction of travelling in addition to measuring the number of steps, when the positioning can be performed even in a nearfield of a cell formed by a single active antenna 101, when the TAGs direction of travelling is known when it exits from the near field of the positioning cell formed by the active antenna 101. Information on the compass direction and on the travelled distance is sent by the TAG 100. Received signal strength information (RSSI) of the beacon signal sent by the TAG 100 is preferably obtained by the active antenna, while the TAG 100 sends said step measurement information and direction information.

TAG rarely sends its data and a beacon signal in order to minimize power consumption, only when its location changes significantly, or because of any event recognized by its operation logic. The implementation of electronic compass 152 is most preferably based on an integrated circuit solution, i.e. on an electronic compass circuit.

Positioning in a system based on one or more of the active antennas and TAG performing step and direction measurement can be further improved by placing over the doors of lanes fixed installations versions of TAG 100 of the system, type Door-TAG, which identifies for example, a distance change of a magnet attached to a door in relation to the location of the TAG most simply based on a reed switch, or in a sophisticated version the magnetic field is measured by a sensor, which allows a greater detection range to place the TAG more freely. Said sensing element may preferably be even the same sensor, by which the compass of the mobile TAG 100 is implemented.

Thus, the system receives information on the room door which has been opened in the hallway at the same time, while the TAG 100 is moving in said direction. Event detection logic is improved by the TAG information that stepping has stopped and/or that direction has changed at the same moment, when the door-TAG indicates the event. On the basis of said information the events can be logically combined with a very high probability of accuracy and by doing so quite reliably provide accurate positioning with respect to the room in question. At the same time the system will automatically certify tracking information as RSSI measurement values from the TAG in said room without separate "site survey"-type system training, which has to be performed in the traditional systems when placing the system into use.

In addition, beacon signal measurement values obtained by the active antenna can be statistically processed and over time readings can be detected on the basis of measurement values, which refer to said person's general places of location, including workplaces, bed, toilet, etc. That information can be used in the automatic training of the system, still without a need for "site survey" type training. Additional value to Door-TAG investment in a building is for example in a emergency call application, when the same door-TAG indicates preferably, e.g. by voice and sign light flashing above the door of the room where a person needing assistance is located in the corridor after the person has called help by his alarmTAG, making it easier and faster to get help.

The electronic compass solution 152 of TAG 100 allows utilization of a TAG 100, attached to a user's body or clothing, in at least three coordinates (x, y, z), which feature, together with information of TAG measurements of bed weight and/or of movements in the bed and at least together with positioning information updated by the system, implements an automatic notification of an abnormal situation, where the user is in a horizontal position outside of his bed.

The TAG according to the invention is able to, in a particular application with the aid of an electronic compass 152 and a shock sensor by using suitable program algorithms, to detect, for example, that the person carrying it falls down or other abnormal behaviour and is able to inform this by its radio part at least to the active antenna, which by its telecommunications means forwards this information without limitations, by using wired or wireless communication. If necessary, detection accuracy of a fall down situation can be improved by use of an acceleration sensor of the electronic compass circuit, for example, AK8976A, acceleration sensor, or by use of a separate acceleration sensor, if the electronic compass circuit of the application is not able to measure acceleration.

In a very preferred embodiment of the invention to detect a fall down situation, the use of the traditional "acceleration, followed by a hit, and horizontal position" measurement procedure is even unnecessary, even when only a horizontal position of the person and information that the person has left his bed is used as a condition for fall down notification. This ensures that an error alarm is not given when the person goes normally to sleep in a horizontal position. Similarly, when a person lies down, though very slowly, as in the case of sickness, the matter may be reported immediately at least an abnormal event, in work safety or patient safety control related applications, for example.

In addition, the method related to identification of the horizontal position reduces the energy needed by the battery of the TAG 100 the user wears because an acceleration measurement need not be made quickly to process the situation. Such an acceleration measurement need not be made because, for an abnormal event indication, it is sufficient that the person has left the bed and is in a horizontal position.

The sequence of events is problematic for the use of an acceleration sensor, because the triggering to process the situation is only obtained from the impact, which wakes up the TAG to measure acceleration, when the acceleration sensor should have been connected to measure acceleration before the impact. This means in principle that the acceleration sensor should be connected constantly to be able to detect such an event. As IC technology advances, the power consumption problem of acceleration measurement is diminishing, and new circuit solutions, such as for example the Analog Devices ADXL346 chip, can continuously measure acceleration with a power consumption which, according to the manufacturer, is only 23 uA. It is thus possible with one acceleration sensor, in addition to detecting a fall down situation, to perform other functions such as the identification of impact, which functions would otherwise require their own sensors and programs. Also the step measurement can be performed by the same circuit, such as by the above-mentioned Analog Devices ADXL346.

Figure 3:
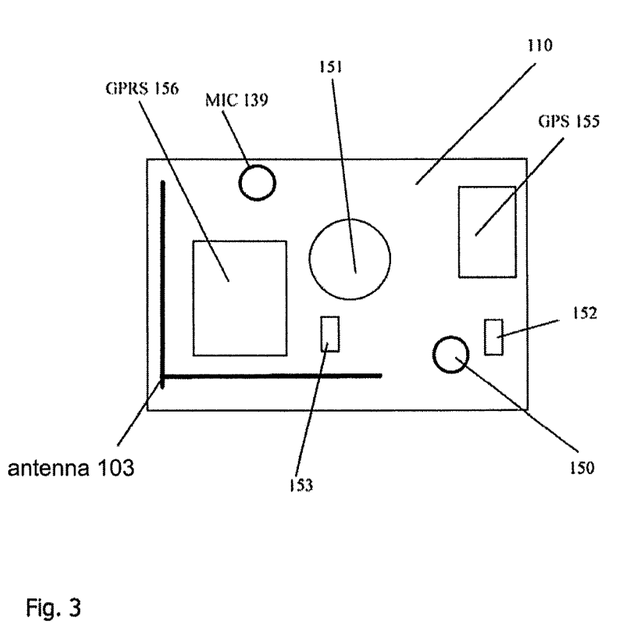
FIG. 3 presents an example structure of a complex and sophisticated implementation of a TAG 100 according to an exemplary embodiment of the invention.

For the detection of a fall down the TAG should be attached to the body, such as e.g. a pulse counter, so that the horizontal position of the body can be indicated with certainty. Also with an appropriate way to attach TAG 100 to clothing or headgear, TAG 100 is able to indicate the position of the body and, depending on the application, the alarm can be conditioned to avoid an error alarm with other measurement or feedback data. The other measurement or feedback data can indicate such conditions as: (1) the person is not moving, or (2) is passive, or (3) a lack of response to a loud noise generated by a TAG piezo membrane 151, or to vibrations generated from a vibration element which is familiar from a mobile phone. A bed-TAG__1 100 is a preferred embodiment of TAG 100 for a bed control application, where the impact sensor 151 of FIG. 3 is replaced by a weight measuring sensor, such as a resistive or piezoelectric sensor, which TAG 100 is located under a leg of a person's bed. The TAG indicates when a person has left the bed by observing intelligently, at least the weight of the bed, and by comparing the readings to a situation where the location of the person is reported to be far away from the bed. Said weight measurement by the TAG is able to adapt to reasonable weight changes in conditions of varying loads as a result of its intelligence and accuracy in positioning, when the center of gravity of the bed changes.

The TAG may also send information about a person's movement in bed during the night, for example on the basis of signals from a piezoelectric movement sensor 153 located in the same unit, if the TAG's weight/pressure-measuring sensor 151 is unable to measure such movement with adequate sensitivity.

A preferred bed-TAG versio2 may be nearly the same as normal TAG 100 according to the invention, except that it needs to only have a sensitive motion sensor, for example, a piezoelectric motion sensor, which is, for example, located below a mattress, and which indicates and identifies motion and/or pressure against the mattress, said data together with positioning information being sufficient to guarantee a reliable indication of the bed conditions. To the tag can also be attached a bed sensor, for example Emfit Bed Sensor, which is normally located under the mattress and commonly available.

At best, the TAG may send the collected kinetic measurement data as a time series, for example, in one or more packages in RF at specified time intervals to minimize power consumption, in which case the receiving active antenna can transmit the data for example to a PC, where it can be viewed as a graphic activity curve also through a browser and remotely.

The drawing of the activity curve continues, if necessary, when the person is away from the bed, the carried TAG 100 operating in the same way as the bed-TAG 100, at least based on the measurement results of the motion detector. By this method, the drawing of the activity curve can be performed around the clock, even if the person takes off the carried TAG.

The mobile TAG can also store measurement information during the day while being out of reach of the active antenna and process the stored measurement data when re-entering the range area.

Since for the detection of fall down the TAG 100 is already attached to the body, e.g. such as by pulse counters, it can also conveniently measure heart rate by its motion detector, which information it can send for example to a wrist pulse counter with an appropriate protocol in addition to the heart rate data sent with other information to the active antenna. Pulse is obtained as an activity curve and the curve of energy consumption in the corresponding graph is sent, to eg a PC or most simply is sent as a numerical figure to the active antenna 101 connected to a display device.

Energy consumption can be estimated fairly accurately, when the heart rate, distance/pace and the person's weight is known, which weight can be measured if desired automatically by bed sensors, and by installing under all legs of the bed corresponding tags. On the basis of reported measurement values from said tags, for example, the mobile TAG 100, or the active antenna 101 can calculate a combined weight of the person and the bed and subtract the weight of the bed, which can be measured when the positioning sensor indicates that the person is far away from the bed. By this tag solution a passive observation of a person's weight variation can be performed, and a person's weight curve can be represented graphically in a time domain with other curves. This observation of a person's weight variation is of significant benefit, for example, in monitoring effects of the dispensing of diuretic medication to a person.

In addition to information verifying that a person is in bed, the active antenna can utilize the automatically learned location information regarding the bed, together with measurement data obtained by weighing of the bed, to significantly reduce the time to give an automatic alert of a genuine fall down situation outside of the bed, when compared to traditional solutions, which require an unreasonably long time to analyze the situation before notification is given due to a fear of false alarms.

A localised fall down event can also be reported when the TAG 100 is outside the active antennas 101 RF range, for example outdoors, if the tag according the invention includes at least the GPS electronics part 155 or, alternatively, either the general wireless communication electronics part is equipped with for example a GPRS-compatible protocol implemented module 156 or the person has a cell phone, for example, with a Bluetooth capability and has installed thereon, for example, a Java application, which can communicate with the TAG via Bluetooth.

One version of the active TAG 100 can also be integrated inside a mobile phone or other portable device so that it informs the phone of its location indoors out of reach of the GPS. Allowing for the fact that the phone turns the GPS on, only outdoors, this will enable significant energy savings of phone power consumption, especially if a user is mostly indoors.

Such a version of a TAG that is enabled to operate even independently without an active antenna, with the bed sensor together, but detecting an exit to outdoors is thus dependent on the RF range of the mobile TAG and the bed-TAG, which range is inaccurate.

When to the TAG 100 is added the above-mentioned electronic compass, using the earth's magnetic field to measure a direction of travel, positioning can be carried out even relying only on a near field of a cell formed by one active antenna 101, when the distance, direction and the beacon signal strength sent by the TAG is known. The TAG sends a beacon signal with the above-mentioned data and receives, if not immediately, then next time, from the active antenna new data, based at least on said measurements, in the RF reception direction, and if necessary, also information about a larger entity. Most simply the TAG 100 may report its location change in the beacon signal. For example, the TAG 100 may report its travelled distance as subdistances and its direction every time the direction changes, starting from the last active 101 antenna and/or from the point mentioned in the message before the last message each time the change in the travel direction is larger than a set threshold, or at specified time intervals by storing information in order to minimize power consumption, and by sending the information at the above-mentioned time intervals, e.g. once every 20 seconds, as a sequence, which consists of a series of successive measurements.

A larger entity comprised of several active antennas 101 can also take advantage of triangulation and mathematical algorithms in obtaining a more accurate location of a TAG 100 on the basis of a RSSI value of the beacon signal sent by the TAG 100. At the same time each individual active antenna's 101 good direction selectivity may be utilized to improve the accuracy of the determination of the location of the TAG 100, in addition to step measurement information/direction information sent by the TAG 100 with the beacon signal.

For outdoor positioning of active antennas, about a one kilometer spaced network is needed, for example, whose components can also be active antennas placed in private residences, or in service residences. Using such a network, a very extensive positioning area for the TAGs can be obtained whose power consumption is minimal for example compared to GPS positioning solutions.

An active antenna or some other system preferably updates and refines as return data to the TAG its self-maintained location information such as coordinates, vectors and/or area knowledge. The form of presenting the information depends on the application, the system, the method of presenting the information, and the required accuracy to perceive location. For example, the form of presenting the information may be on a map presented on a PC's display or on an alphanumeric corridor screen.

The TAG will be able to report, in addition to its user-id, also its location. For example, in an emergency call situation, the person calling for help may cause the TAG to report its user-id and location by pressing a button 150, or by hitting an impact sensor 151 associated with the TAG, which sensor can be adjusted to the appropriate sensitivity depending on the application. The impact sensor principle to trigger the alarm permits the TAG to be located under clothing, for example, because for the hit accuracy of the hand it is sufficient that the tag gets a hit strong enough, which differs from the normal operation.

At least the location of the push button 150 and the impact sensor 151, as well as the location of a microphone, and other electronics, may vary, depending on different parts of the circuit board being different from that presented in FIG. 3.

To the TAG according to the invention can be attached, or more preferably integrated a GPS electronics part 155 for outdoor positioning as well as a common wireless communication electronics component for example implemented as a GPRS-compatible protocol module 156 or as integrated to a circuit board, by which the device can indicate its location out of reach of the active antenna such as in outdoor areas. The device can still operate with very low power consumption most of the time because the active antenna is located in an exit of the building, the TAG knows that the GPS is turned on only outdoors, and for example, GPRS is used only when it is needed. This allows a very compact implementation of the mobile device, at least of the size of the batteries, because many outdoor-use applications have normally very short periods of operating time.

At least half-duplex voice communication can be implemented very cheaply using a GPRS connection. For example an impact sensor 151, based on a piezoelectric audio element, may be connected to a GPRS 156 audio terminal in the same switching solution, as the microphone 139 is disconnected from other electronics and is connected to a GPRS 156 audio input for the time of voice communication. When aiming at improved sound quality, instead of the audio element, an actual loudspeaker solution can be connected.

In a preferred form, instead of the separate antennas, TAG 100 RFID electronics and/or GPS electronics part 155 and the common wireless communication electronics unit 156 use a common antenna 103, the electrical length of which is changed for each frequency suitable for the used purpose, for example, with the same RF switch solution, which is used for the active antenna electronics unit 106 used in connection with the radiators 102, 104. In some applications, the common wireless communication electronics unit 156 is replaced by Bluetooth electronics, through which the TAG communicates with a mobile phone, for example, allowing TAG power consumption and size reduction compared to a scenario in which the TAG includes electronics such as the GPRS 156.

According to the same principle the TAG 100 may change the electrical length of its antenna when operating in other frequency bands as the RFID-band signalling of the active antenna 101. Thus the actual data communication between the TAG and the active antenna 101 in the long distance field, for example FSK signalling, can operate at a completely different frequency range than RFID positioning.

Active antenna wireless communication module 125 may also be a WLAN base station, when the WLAN base station replaces the active antenna wireless communication module 125. Outdoor positioning can be also performed with the active antenna solution preferably in such a way that a large monitored area is formed by a network of several active antennas, so that at least on the area edges the active antennas 101 are placed, the active antennas 101 being targeted to receive a beacon signal sent by the TAG 100. The measurement values obtained from the beacon signal are transmitted by each active antenna, e.g. by radio link, to a central computing unit, which can be, for example, a PC. The central computing unit, on the basis of mathematical algorithms, calculates locations of TAGs moving in the area, which location information is available from the central computing unit in real time, for example, by using a web browser, for example, when searching for a missing person. This network can be formed easily also in such a way that active antennas are placed on main buildings in the area providing services, which together with active antennas located in homes can realize even without special arrangements a quite wide positioning network.

In outdoors positioning, an active antenna can reach distances up to a kilometer away from the active antenna, when the location of the antenna is high enough, an appropriate radio frequency band is selected, and the TAG beacon signal to be sent uses adequate transmission power when the TAG is moved to the outdoors.

Figure 2:
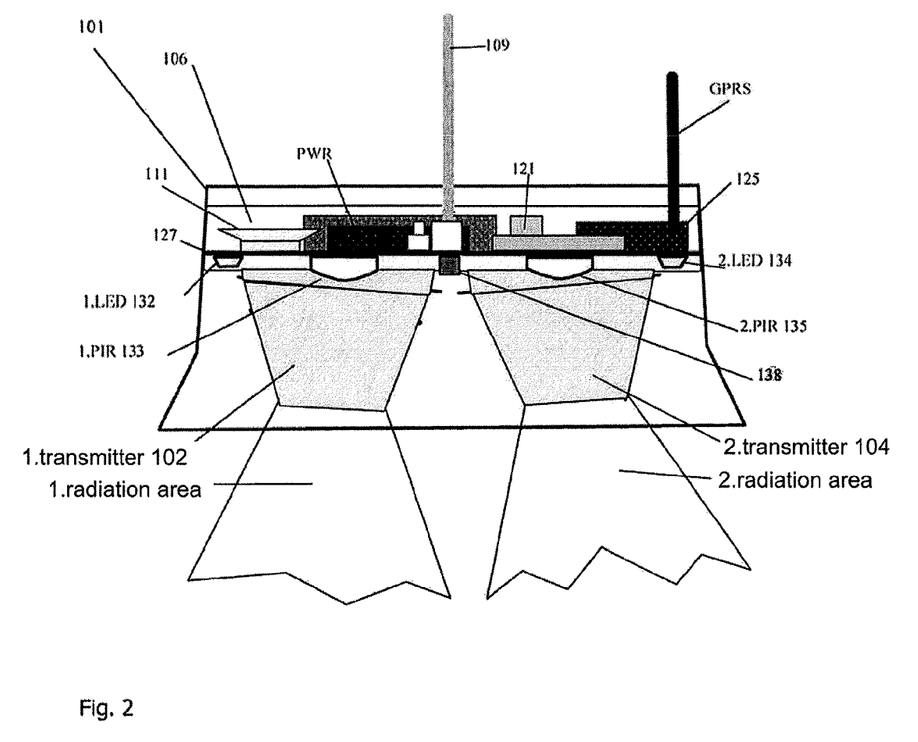
FIG. 2 presents an example of construction of a complex and sophisticated implementation of the active positioning system antenna according to one exemplary embodiment of the invention, the figure having limitations of a two dimensional image.

In the text and claims the electronics unit components presented as modules, such as the wired communications module 121, can in some applications be also highly integrated to the printed circuit board, and would therefore not necessarily be individual units, as illustrated in FIG. 2, in which most of the actuators and electronics parts needed in different variations of the invention are presented in forms of modules. It is also to be noted that the modules and components in FIG. 2 are generally not located in their true locations for the reason that a figure must be presented in a patent application in a two-dimensional form. Control logic, control parts and processing parts are usually so distributed and located on the circuit board 127 of the electronics unit 106, that they cannot be presented as separate modules.

The RF amplifier/connector part located in the electronics unit 106 of the invention presented in FIG. 2 may be, in some embodiments of the invention, an entirely separate sub-module, so that it can be cheaply noise protected, for example by a metallic cover. The same also applies to parts of the electronics units of the invention in the tag 100.

The distinction between a near field and a far field presented in this document refers to the fact that in the near field RF signal reception and detection performed by the TAG 100 is possible directly without a pre-amplifier, for example, with a diode detector. In the far field, at least, a preamplifier is required, and for a long distance, at least one amplifier stage must be added. That is why far field measurement is performed by base station electronics 106 on the basis of a beacon signal sent by the TAG 100.

Although the invention has been presented in reference to the attached figures and specification, the invention is by no means limited to those as the invention is subject to variations within the scope allowed for by the claims according to different kind of applications.

What is claimed is:

1. A combination of an active positioning system for locating at least one position of at least one mobile device by utilizing radio frequency technology and the at least one mobile device, the active positioning system comprising:
    at least one stationary base station, wherein the at least one stationary base station includes a positioning antenna system, the positioning antenna system having an electronics unit including at least one transceiver,
    wherein the positioning antenna system comprises:
        at least two directional antennas for transmitting information signals comprising at least position information to the at least one mobile device, the at least position information comprising information of an effective area monitored by the at least two directional antennas which transmit the information signals by using a certain transmission power, wherein the effective area monitored by the at least two directional antennas is dividable into two or more sections based on power measurement, calculation and judging,
    wherein the at least one mobile device is at least one TAG, which is fixed to a user or an object directly or indirectly, the at least two directional antennas further monitoring different sections of at least one monitored area and transmitting additional information signals comprising antenna specific limit and control values to the at least one TAG in addition to transmitting information signals comprising the at least position information,
    the positioning antenna system further comprising:
        at least one radio frequency (RF) switch available to each of the at least two directional antennas, the at least one RF switch being in turn and/or selectively at the same time connected to one or more power amplifier, and
        an isolation arrangement for electrically disconnecting one or more of the at least two directional antennas so that at least one disconnected antenna of the at least two directional antennas becomes a high impedance object with respect to at least one connected antenna of the at least two directional antennas,
    said at least one TAG comprising:
        at least one antenna to receive said information signals and said additional information signals; and
        at least one electronics unit to form measurement signals and information signals, based on said information signals and said additional information signals received by the at least one antenna of said at least one TAG, for performing information processing for a position of said at least one TAG,
    the at least one antenna of said at least one TAG transmitting at least one of the formed measurement signals and information signals to the active positioning system, said at least one base station receiving said at least one transmitted signal of the formed measurement signals and information signals,
    the active positioning system further comprising:
        control means to control transmission power of the at least two directional antennas, based on said at least one signal of the formed measurement signals and information signals received by the at least one base station, for performing information processing of the at least one TAG position at least based on said transmission power, and
    wherein the active positioning system is at least arranged to measure RSSI (Received Signal Strength Information) values from the at least one transmitted signal of the formed measurement signals and information signals received by the at least two directional antennas of said at least one base station to determine a highest measured value of RSSI from the positioning antenna system, from the antenna which is located in a most preferred direction from the TAG, and respectively lower measured values from at least one antenna of the at least two directional antennas other than an antenna having the highest measured value of RSSI as a function of angle deviation from the most preferred direction.

2. The combination of the active positioning system and the at least one mobile device according to claim 1, wherein the active positioning system base station comprises an outside or inside motion detector in a device casing connected to the electronics unit of the active positioning system base station, and operation of the motion detector is based on utilization of at least one of the following technologies: infrared technology, ultrasound technology and microwave technology, a detection area of the motion detector overlapping with at least two monitored areas, which are monitored by the at least two directional antennas.

3. The combination of the active positioning system and the at least one mobile device according to claim 1, wherein the active positioning system base station comprises a telecommunication connection arrangement, which is attached by integrating to a printed circuit board of the electronics unit of the active positioning system base station, to deliver data between the active positioning system and the outside world.

4. The combination of the active positioning system and the at least one mobile device according to claim 1, wherein the active positioning system base station comprises at least one loudspeaker and at least one microphone to perform sound reproduction and at least bidirectional talking connection, and said microphone disconnects automatically when a radio microphone of the at least one TAG switches on.

5. A combination of an active positioning system for locating at least one position of at least one mobile device by utilizing radio frequency technology and the at least one mobile device, the active positioning system comprising:
  at least one stationary base station, wherein the at least one stationary base station includes a positioning antenna system, the positioning antenna system having an electronics unit including at least one transceiver,
  wherein the positioning antenna system comprises:
    at least two directional antennas for transmitting information signals comprising at least position information to the at least one mobile device, the at least position information comprising information of an effective area monitored by the at least two directional antennas which transmit the information signals by using a certain transmission power, wherein the effective area monitored by the at least two directional antennas is dividable into two or more sections based on power measurement, calculation and judging,
  wherein the at least one mobile device is at least one TAG, which is fixed to a user or an object directly or indirectly,
  the at least two directional antennas further monitoring different sections of at least one monitored area and transmitting additional information signals comprising antenna specific limit and control values to the at least one TAG in addition to transmitting information signals comprising the at least position information,
  the positioning antenna system further comprising:
    at least one radio frequency (RF) switch available to each of the at least two directional antennas, the at least one RF switch being in turn and/or selectively at the same time connected to one or more power amplifier, and
    an isolation arrangement for electrically disconnecting one or more of the at least two directional antennas so that at least one disconnected antenna of the at least two directional antennas becomes a high impedance object with respect to at least one connected antenna of the at least two directional antennas,
  said at least one TAG comprising:
    at least one antenna to receive said information signals and said additional information signals; and
    at least one electronics unit to form measurement signals and information signals, based on said information signals and said additional information signals received by the at least one antenna of said at least one TAG, for performing information processing for a position of said at least one TAG,
  the at least one antenna of said at least one TAG transmitting at least one of the formed measurement signals and information signals to the active positioning system, said at least one base station receiving said at least one transmitted signal of the formed measurement signals and information signals,
  the active positioning system further comprising:
    control means to control transmission power of the at least two directional antennas, based on said at least one signal of the formed measurement signals and information signals received by the at least one base station, for performing information processing of the at least one TAG position at least based on said transmission power,
  wherein the active positioning system is at least arranged to measure RSSI (Received Signal Strength Information) values from the at least one transmitted signal of the formed measurement signals and information signals received by the at least two directional antennas of said at least one base station to determine a highest measured value of RSSI from the antenna which is located in a most preferred direction from one of the at least one TAG, and respectively lower measured values from at least one antenna of the at least two directional antennas other than an antenna having the highest measured value of RSSI as a function of angle deviation from the most preferred direction,
  wherein the at least one electronics unit of the at least one TAG comprises an electronics compass application, which uses the magnetic field of the Earth to measure direction of movement and a number of steps of movement of a corresponding TAG, and to perform positioning on an area of one or more cells formed by one or more active positioning system, when the movement direction of the corresponding TAG is known as it exits from area of a positioning cell formed by an active positioning system, information on the compass direction and on the distance of movement being transmitted by the corresponding TAG, and information on the RSSI (Received Signal Strength Information) of a beacon signal transmitted by the corresponding TAG being obtained by an active positioning system base station for each of its at least two directional antennas receiving the beacon signal, which strength information is obtained essentially simultaneously with said distance information and said compass direction information transmitted by the corresponding TAG.

6. The combination of the active positioning system and the at least one mobile device according to claim 5, wherein one of the at least one TAG is attached to a body or clothes of the user and is utilized to detect alignment of the user at least in three coordinates (x, y, z) based on the electronics compass application of the corresponding TAG, which feature, together with information obtained from a TAG measuring weight of a bed and/or movements in the bed, and at least together with positioning information updated by the active positioning system, implements an automatic transmission of information on an abnormal situation, in which the user is in horizontal alignment outside of a bed.

7. A combination of an active positioning system for locating at least one position of at least one mobile device by utilizing radio frequency technology and the at least one mobile device, the active positioning system comprising:
  at least one stationary base station, wherein the at least one stationary base station includes a positioning antenna system, the positioning antenna system having an electronics unit including at least one transceiver,
  wherein the positioning antenna system comprises:
    at least two directional antennas for transmitting information signals comprising at least position information to the at least one mobile device, the at least position information comprising information of an effective area monitored by the at least two directional antennas which transmit the information signals by using a certain transmission power, wherein the effective area monitored by the at least two directional antennas is dividable into two or more sections based on power measurement, calculation and judging, wherein the at least one mobile device is at least one TAG, which is fixed to a user or an object directly or indirectly, the at least two directional antennas further monitoring different sections of at least one monitored area and transmitting additional information signals comprising antenna specific limit and control values to the at least one TAG in addition to transmitting first information signals comprising the at least position information, the positioning antenna system further comprising:
  at least one radio frequency (RF) switch available to each of the at least two directional antennas, the at least one RF switch being in turn and/or selectively at the same time connected to one or more power amplifier, and
  an isolation arrangement for electrically disconnecting one or more of the at least two directional antennas so that at least one disconnected antenna of the at least two directional antennas becomes a high impedance object with respect to at least one connected antenna of the at least two directional antennas, said at least one TAG comprising:
  at least one antenna to receive said first information signals and said additional information signals; and
  at least one electronics unit to form measurement signals and information signals, based on said information signals and said additional information signals received by the at least one antenna of said at least one TAG, for performing information processing for a position of said at least one TAG, the at least one antenna of said at least one TAG transmitting at least one signal of the formed measurement signals and information signals to the active positioning system, said at least one base station receiving said at least one transmitted signal of the formed measurement signals and information signals, the active positioning system further comprising:
  control means to control transmission power of the at least two directional antennas, based on said at least one signal of the formed measurement signals and information signals received by the at least one base station, for performing information processing of the at least one TAG position at least based on said transmission power, wherein the active positioning system is at least arranged to measure RSSI (Received Signal Strength Information) values from the at least one transmitted signal of the formed measurement signals and information signals received by the at least two directional antennas of said at least one base station to determine a highest measured value of RSSI from the antenna which is located in a most preferred direction from the TAG, and respectively lower measured values from at least one antenna of the at least two directional antennas other than an antenna having the highest measured value of RSSI as a function of angle deviation from the most preferred direction, and the positioning antenna system comprises a light emitting diode (LED) lighting arrangement integrated or attached to the electronics unit of the positioning antenna system to replace a lamp which would otherwise interfere with a location of the positioning antenna system.

* * * * *